UNITED STATES PATENT OFFICE.

ROY ALFRED PLUMB, OF DETROIT, MICHIGAN, ASSIGNOR TO TRUSSED CONCRETE STEEL COMPANY, OF DETROIT, MICHIGAN, A CORPORATION OF MICHIGAN.

METHOD OF RENDERING CEMENT MORTAR AND CONCRETE WATERPROOF.

1,036,898.  Specification of Letters Patent.  Patented Aug. 27, 1912.

No Drawing.  Application filed January 2, 1912. Serial No. 669,007.

*To all whom it may concern:*

Be it known that I, ROY ALFRED PLUMB, a citizen of the United States, and a resident of Detroit, in the county of Wayne and State of Michigan, have invented a new and useful Method of Rendering Cement Mortar and Concrete Waterproof, of which the following is a specification.

As homegeneity is one of the first essentials to successful integral waterproofing, it is highly important that the waterproofing compound be of such a nature as to insure its most even and uniform distribution throughout the mass to be waterproofed.

It is known that bodies of a colloidal nature yield the most efficient and satisfactory waterproofing results. Prominent among the colloidal bodies which have been generally employed in the art of waterproofing, could be mentioned clays, aluminum hydroxid, slaked lime, soaps, resinates, fats and hydrocarbons. Details for the use of these several colloids are covered by previous patents well known in the art.

Of all commercially available colloidal bodies, the insoluble soaps, due to their natural repellent properties and the permanency of their colloidal formation, are best suited for general waterproofing operations, provided that they can be so treated as to insure their uniform and even distribution.

The improved method defined in this patent covers a method of treating these insoluble soaps so as to temporarily provide for their miscibility with water, to insure uniform distribution throughout the mass through the medium of the gaging water used to temper the dry mixture of cement and aggregate.

It is observed in practice that regardless of the great care that may be exercised in the thorough and uniform mixing of the dry repellent powder with the dry cement, and then with the dry aggregate, there is more or less tendency, when the water is added to temper the mass, for the waterproofing compound, due to its repellent nature, to be expelled from portions of the mass and concentrated and stratified in other parts, entirely destroying the even distribution which may have originally been established through the careful dry mixing of the compound with the dry cement. This result is particularly intensified with the increasing fluidity of the concrete, as the resistance to flow throughout the mass is proportionately decreased and the repellent powder, due to its lighter gravity and inherent repellent properties, tends to rise to the top of the mass of concrete in which it is used. It is important, therefore, in addition to the natural colloidal and repellent properties of the insoluble soaps, that provisions be made for their temporary miscibility with water, to insure their perfect distribution.

When the various insoluble soaps, such as aluminum palmitate and calcium stearate, are treated with water containing a very small amount of ammonium hydrate, they become very readily miscible with water, yielding, when mixed with water, a perfectly developed colloidal solution. On the evaporation of the ammonia, the insoluble soap assumes its original repellent properties, the function of the ammonia being to provide for only a temporary miscibility with water during the process of distribution throughout the mass, and on the evaporation of the ammonia, on hardening, the repellent properties of the soaps are restored and full efficiency obtained.

The insoluble soap is mixed to the consistency of a pulp or paste with water containing from one (1) to five (5) per cent. of ammonium hydrate. The resultant paste is very thoroughly mixed and ground, to insure a perfectly uniform product. The amount of the ammonia water required for producing the proper consistency with the soap, will depend upon the original condition and properties of the particular insoluble soap employed. The paste is then mixed in definite proportions with the water used to temper the dry mixture of cement and aggregate to be waterproofed.

I claim.

1. The method of rendering cement mortar and concrete waterproof, consisting of mixing a small proportion of ammonia with a water-repellent and insoluble soap to render the latter readily miscible with water, and then mixing the resulting compound with the plastic material.

2. The method of rendering cement mortar and concrete waterproof, consisting of mixing an emulsifying agent with a water-repellent and insoluble soap to render the latter readily miscible with water, and then
5 mixing the resulting compound with the plastic material.

In testimony whereof I have signed this specification in the presence of two subscribing witnesses.

ROY ALFRED PLUMB.

Witnesses:
H. I. BARBOUR,
A. W. FABER.